United States Patent
Sakoda et al.

(10) Patent No.: US 7,961,658 B2
(45) Date of Patent: Jun. 14, 2011

(54) COMMUNICATION SYSTEM, TRANSMISSION DEVICE AND METHOD THEREOF, AND RECEPTION DEVICE AND METHOD THEREOF

(75) Inventors: Kazuyuki Sakoda, Tokyo (JP); Kenzoh Nishikawa, Kanagawa (JP); Chihiro Fujita, Kanagawa (JP); Mitsuhiro Suzuki, Chiba (JP); Erika Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 970 days.

(21) Appl. No.: 11/715,928

(22) Filed: Mar. 9, 2007

(65) Prior Publication Data
US 2007/0242618 A1 Oct. 18, 2007

(30) Foreign Application Priority Data
Mar. 17, 2006 (JP) .............................. P2006-074721

(51) Int. Cl.
*G08C 17/00* (2006.01)
(52) U.S. Cl. ........ 370/311; 370/312; 370/328; 455/458; 455/574
(58) Field of Classification Search .................. 370/311; 455/418–420, 343.1–343.5
See application file for complete search history.

(56) References Cited

U.S. PATENT DOCUMENTS
| | | | | |
|---|---|---|---|---|
| 5,509,015 A | * | 4/1996 | Tiedemann et al. | 370/311 |
| 7,826,411 B2 | * | 11/2010 | Gonikberg et al. | 370/328 |
| 2006/0039320 A1 | * | 2/2006 | Kang et al. | 370/328 |
| 2007/0025396 A1 | * | 2/2007 | Ajima | 370/474 |

FOREIGN PATENT DOCUMENTS
JP 2005-033586 2/2005

\* cited by examiner

*Primary Examiner* — Kamran Afshar
*Assistant Examiner* — Neda Behrooz
(74) *Attorney, Agent, or Firm* — Finnegan, Henderson, Farabow, Garrett & Dunner, LLP

(57) ABSTRACT

A communication system includes a transmission device and a reception device. The transmission device includes a first software processor that performs, if a first information portion has been updated, software processing on the first information portion, a first hardware processor that performs hardware processing on a second information portion, a generation unit that generates a beacon signal, and a transmitter that transmits the generated beacon signal. The reception device includes a reception unit that receives the beacon signal, a separator that separates the first information portion from the second information portion, a second hardware processor that performs hardware processing on the separated second information portion, a determination unit that determines whether the separated first information portion has been updated, and a second software processor that performs, if the first information portion has been updated, software processing on the updated first information portion.

15 Claims, 10 Drawing Sheets

FIG. 4

| Element ID | Information element | Description | |
|---|---|---|---|
| 0 | Traffic Indication Map IE (TIMIE) | Indicates that a device has data buffered for transmission via PCA | FREQUENT UPDATE |
| 1 | Beacon Period Occupancy IE (BPOIE) | Provides a list of the devices from which a device received beacons and beacon slots occupied in the previous superframe | OCCASIONAL UPDATE |
| 2 | PCA Availability IE | Indicates the MASs that a device is available to receive or intends to transmit using PCA | FREQUENT UPDATE |
| 3-7 | Reserved | Reserved | |
| 8 | DRP Availability IE | Indicates a device's availability for new DRP reservations | OCCASIONAL UPDATE |
| 9 | Distributed Reservation Protocol IE (DRP IE) | Indicates a device's reservations with another device | OCCASIONAL UPDATE |
| 10 | Hibernation Mode IE | Indicates the device will not transmit or receive beacons for one or more superframes but intends to wake at a specified time in the future | OCCASIONAL UPDATE |
| 11 | BP Switch IE | Indicates the device will change its BPST at a specified future time | OCCASIONAL UPDATE |
| 12 | Capabilities IE | Indicates which MAC capabilities a device supports | NO UPDATE |
| 13 | PHY Capabilities IE | Indicates which PHY Capabilities a device supports | NO UPDATE |
| 14 | Probe IE | Indicates a device is requesting one or more IEs from another device or/and responding with requested IEs | OCCASIONAL UPDATE |
| 15 | Application-specific Probe IE | Indicates a device is requesting an Application-specific Probe IE from another device | OCCASIONAL UPDATE |
| 16 | Link Feedback IE | Provides data rate and power control feedback | OCCASIONAL UPDATE |
| 17 | Hibernation Anchor IE | Provides information on devices in hibernation mode | OCCASIONAL UPDATE |
| 18 | Channel Change IE | Indicates a device will change to another channel | OCCASIONAL UPDATE |
| 19 | Identification IE | Provides identifying information about the device, including a name string | NO UPDATE |
| 20 | Master Key Identifier (MKID) IE | Identifies one or more master keys held by the transmitting device | OCCASIONAL UPDATE |
| 21-254 | Reserved | Reserved | |
| 255 | Application Specific IE (ASIE) | Use varies depending on the Application Specific Subtype | DEPENDS ON APPLICATION |

COMMUNICATION SYSTEM, TRANSMISSION DEVICE AND METHOD THEREOF, AND RECEPTION DEVICE AND METHOD THEREOF

CROSS REFERENCES TO RELATED APPLICATIONS

The present invention contains subject matter related to Japanese Patent Application JP 2006-074721 filed in the Japanese Patent Office on Mar. 17, 2006, the entire contents of which are incorporated herein by reference.

BACKGROUND OF THE INVENTION

1. Field of the Invention

The present invention relates to communication systems, transmission devices and methods thereof, and reception devices and methods thereof. More particularly, the present invention relates to a communication system, a transmission device and a method thereof, and a reception device and a method thereof, which are capable of transmitting/receiving beacon signals while the power consumption is suppressed in accordance with the update frequency of information.

2. Description of the Related Art

In a wireless network, a communication terminal used for transmission buffers data to be transmitted to a communication terminal which is in a hibernation mode for the purpose of preventing packet loss. A beacon signal transmitted in a specific cycle triggers activation of the communication terminal which is in a hibernation mode. Specifically, when the communication terminal in a hibernation mode finds a mark attached to the beacon signal which indicates that the beacon signal is to be transmitted to the communication terminal, the communication terminal is activated and receives the data.

In general, a beacon signal includes important information necessary for maintaining line connection. Accordingly, complicated high-level processing is necessary for reception processing and transmission processing of the beacon signal. In the related art, software processing by means of a CPU (Central Processing Unit) is employed for the reception processing and the transmission processing of the beacon signal.

As shown in FIG. 1, since a beacon signal is transmitted in a substantially constant cycle for each superframe, a CPU performs processing in the substantially constant cycle. Accordingly, even when the CPU is in a hibernation mode for suppressing the power consumption, the CPU is activated for the reception processing or transmission processing of the beacon signal. Consequently, it is hard to meet the demand for suppressing the power consumption to an extremely low level while the CPU is waiting for communication.

Japanese Unexamined Patent Application Publication No. 2005-33586 discloses a technique of reducing the power consumption of a wireless communication device.

SUMMARY OF THE INVENTION

However, according to the technique disclosed in Japanese Unexamined Patent Application Publication No. 2005-33586, the power consumption is reduced by fluctuating a receiving standby time and a receiving pause time. Accordingly, when activated, the CPU performs normal reception processing or transmission processing irrespective of whether information is to be updated.

Accordingly, it is desirable to transmit/receive a beacon signal while the power consumption of a communication apparatus is suppressed in accordance with frequency of updates of information.

According to an embodiment of the present invention, there is provided a communication system including a transmission device that transmits a beacon signal and a reception device that receives the beacon signal. The transmission device includes first software processing means for performing, if a first information portion which is to be included in the beacon signal to be transmitted and which is not necessarily updated in every predetermined period of time has been updated, software processing on the updated first information portion, first hardware processing means for performing hardware processing on a second information portion which is to be included in the beacon signal to be transmitted and which is updated at least once in every predetermined period of time, generating means for generating the beacon signal to be transmitted by adding the second information portion subjected to the hardware processing using the first hardware processing means to the first information portion subjected to the software processing using the first software processing means, and transmitting means for transmitting the beacon signal generated using the generating means. The reception device includes receiving means for receiving the beacon signal, separating means for separating the first information portion from the second information portion included in the beacon signal received using the receiving means, second hardware processing means for performing hardware processing on the second information portion separated using the separating means, determining means for determining whether the first information portion separated using the separating means has been updated, and second software processing means for performing, if the determining means determines that the first information portion has been updated, software processing on the updated first information portion.

According to another embodiment of the present invention, there is provided a transmission device including software processing means for performing, if a first information portion which is to be included in a beacon signal to be transmitted and which is not necessarily updated in every predetermined period of time has been updated, software processing on the updated first information portion i hardware processing means for performing hardware processing on a second information portion which is to be included in the beacon signal to be transmitted and which is updated at least once in every predetermined period of time, generating means for generating the beacon signal to be transmitted by adding the second information portion subjected to the hardware processing using the hardware processing means to the first information portion subjected to the software processing using the software processing means, and transmitting means for transmitting the beacon signal generated using the generating means.

The transmission device may further include storing means for storing the first information portion subjected to the software processing using the software processing means.

The storing means may store the first information portion, irrespective of whether the first information portion has been updated, when a beacon signal is to be transmitted for the first time.

The transmission device may further include detecting means for detecting an operation status of the software processing means. When the detecting means detects an operation status indicating that the software processing means has been used more times than a predetermined threshold number of times, the hardware processing means may perform hardware processing on an information portion of interest as a second information portion which is updated at least once in every predetermined period of time.

According to still another embodiment of the present invention, there is provided a transmission method including the steps of performing, if a first information portion which is to be included in a beacon signal to be transmitted and which is not necessarily updated in every predetermined period of time has been updated, software processing on the updated first information portion, performing hardware processing on a second information portion which is to be included in the beacon signal to be transmitted and which is updated at least once in every predetermined period of time, generating the beacon signal to be transmitted by adding the second information portion subjected to the hardware processing to the first information portion subjected to the software processing, and transmitting the generated beacon signal.

According to a further embodiment of the present invention, there is provided a reception device including receiving means for receiving a beacon signal, separating means for separating a first information portion which is included in the beacon signal received using the receiving means and which is not necessarily updated in every predetermined period of time from a second information portion which is included in the beacon signal received using the receiving means and which is updated at least once in every predetermined period of time, hardware processing means for performing hardware processing on the second information portion separated using the separating means, determining means for determining whether the first information portion separated using the separating means has been updated, and software processing means for performing, if the determining means determines that the first information portion has been updated, software processing on the updated first information portion.

The reception device may further include compressing means for compressing the first information portion, if the determining means determines that the first information portion has been updated, and storing means for storing the first information portion compressed using the compressing means.

The storing means may store the first information portion, irrespective of whether the first information portion has been updated, when a beacon signal is received for the first time.

The determining means may compare the first information portion included in a beacon signal which was most recently received and which has been stored in the storing means with a first information portion included in a beacon signal which was received immediately prior to the most recently received signal and may determine whether the first information portion has been updated.

The reception device may further include detecting means for detecting an operation status of the software processing means. When the detecting means detects an operation status indicating that the software processing means has been used more times than a predetermined threshold number of times, the separating means may separate an information portion of interest as a second information portion which is updated at least once in every predetermined period of time.

According to a still further embodiment of the present invention, there is provided a reception method including the steps of receiving a beacon signal, separating a first information portion which is included in the received beacon signal and which is not necessarily updated in every predetermined period of time from a second information portion which is included in the received beacon signal and which is updated at least once in every predetermined period of time, performing hardware processing on the second information portion, determining whether the first information portion separated using the separating means has been updated, and performing, if it is determined that the first information portion has been updated, software processing on the updated first information portion.

In the transmission device, if a first information portion which is to be included in a beacon signal to be transmitted and which is not necessarily updated in every predetermined period of time has been updated, software processing is performed on the updated first information portion, hardware processing is performed on a second information portion which is to be included in the beacon signal to be transmitted and which is updated at least once in every predetermined period of time, the beacon signal to be transmitted is generated by adding the second information portion to the first information portion, and the beacon signal is transmitted. In the receiving device, the first information and the second information in a received beacon signal is separated from each other. The second information is subjected to hardware processing. If it is determined that the first information has been updated, the first information is subjected to software processing.

If a first information portion which is to be included in a beacon signal to be transmitted and which is not necessarily updated in every predetermined period of time has been updated, software processing is performed on the updated first information portion, hardware processing is performed on a second information portion which is to be included in the beacon signal to be transmitted and which is updated at least once in every predetermined period of time, the beacon signal to be transmitted is generated by adding the second information portion to the first information portion, and the generated beacon signal is transmitted.

A first information portion which is included in the received beacon signal and which is not necessarily updated in every predetermined period of time is separated from a second information portion which is included in the received beacon signal and which is updated at least once in every predetermined period of time, hardware processing is performed on the second information portion, and if it is determined that the first information portion has been updated, software processing is performed on the updated first information portion.

Accordingly, a beacon signal is transmitted while the power consumption is suppressed in accordance with the update frequency of information.

BRIEF DESCRIPTION OF THE DRAWINGS

FIG. 4 is a table showing an example of transmitted information included in a beacon signal;

DESCRIPTION OF THE PREFERRED EMBODIMENTS

Figure 1:
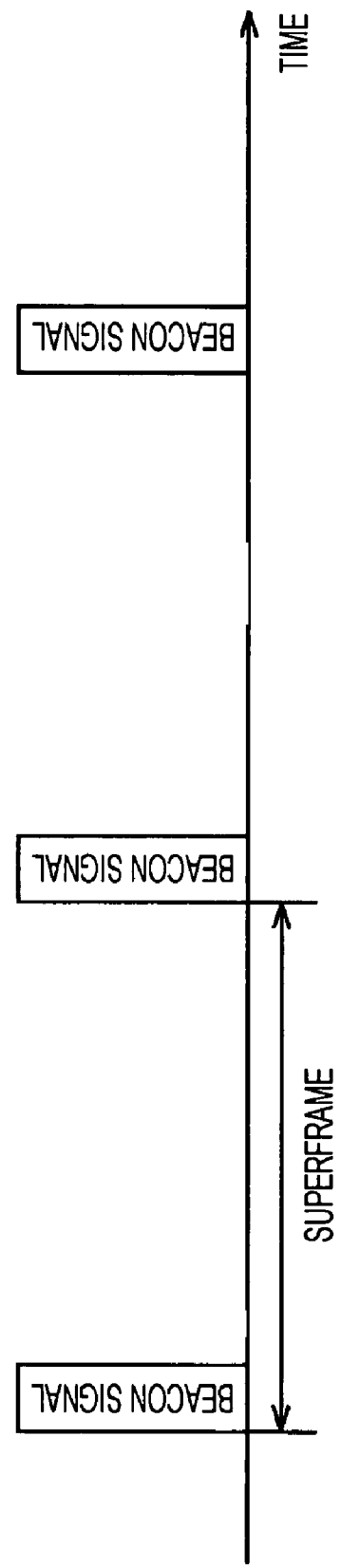
FIG. 1 is an explanatory diagram of beacon signals.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, there is provided a communication system (for example, a communication system shown in FIG. 2) including a transmission device (for example, a transmitter 12 shown in FIG. 3) that transmits a beacon signal and a reception device (for example, a receiver 11 shown in FIG. 3) that receives the beacon signal. The transmission device includes first software processing means (for example, a CPU 28 shown in FIG. 6) for performing, if a first information portion which is to be included in the beacon signal to be transmitted and which is not necessarily updated in every predetermined period of time has been updated, software processing on the updated first information portion, first hardware processing means (for example, a hardware processor 24 shown in FIG. 6) for performing hardware processing on a second information portion which is to be included in the beacon signal to be transmitted and which is updated at least once in every predetermined period of time, generating means (for example, an information addition unit 32 shown in FIG. 6) for generating the beacon signal to be transmitted by adding the second information portion subjected to the hardware processing using the first hardware processing means to the first information portion subjected to the software processing using the first software processing means, and transmitting means (for example, a transmission unit 33 shown in FIG. 6) for transmitting the beacon signal generated using the generating means. The reception device includes receiving means (for example, a reception unit 22 shown in FIG. 5) for receiving the beacon signal, separating means (for example, an information separation unit 23 shown in FIG. 5) for separating the first information portion from the second information portion included in the beacon signal received using the receiving means, second hardware processing means (for example, a hardware processor 24 shown in FIG. 5) for performing hardware processing on the second information portion separated using the separating means, determining means (for example, a comparator 27 shown in FIG. 5) for determining whether the first information portion separated using the separating means has been updated, and second software processing means (for example, a CPU 28 shown in FIG. 5) for performing, if the determining means determines that the first information portion has been updated, software processing on the updated first information portion.

According to another embodiment of the present invention, there is provided a transmission device (for example, a transmitter 12 shown in FIG. 6) including software processing means (for example, a CPU 28 shown in FIG. 6) for performing, if a first information portion which is to be included in a beacon signal to be transmitted and which is not necessarily updated in every predetermined period of time has been updated, software processing on the updated first information portion, hardware processing means (for example, the hardware processor 24 shown in FIG. 6) for performing hardware processing on a second information portion which is to be included in the beacon signal to be transmitted and which is updated at least once in every predetermined period of time, generating means (for example, the information addition unit 32 shown in FIG. 6) for generating the beacon signal to be transmitted by adding the second information portion subjected to the hardware processing using the hardware processing means to the first information portion subjected to the software processing using the software processing means, and transmitting means (for example, the transmission unit 33 shown in FIG. 6) for transmitting the beacon signal generated using the generating means.

The transmission device may further include storing means (for example, a memory 31 shown in FIG. 6) for storing the first information portion subjected to the software processing using the software processing means.

The transmission device may further include detecting means (for example, a detector 41 shown in FIG. 10) for detecting an operation status of the software processing means.

Figure 8:
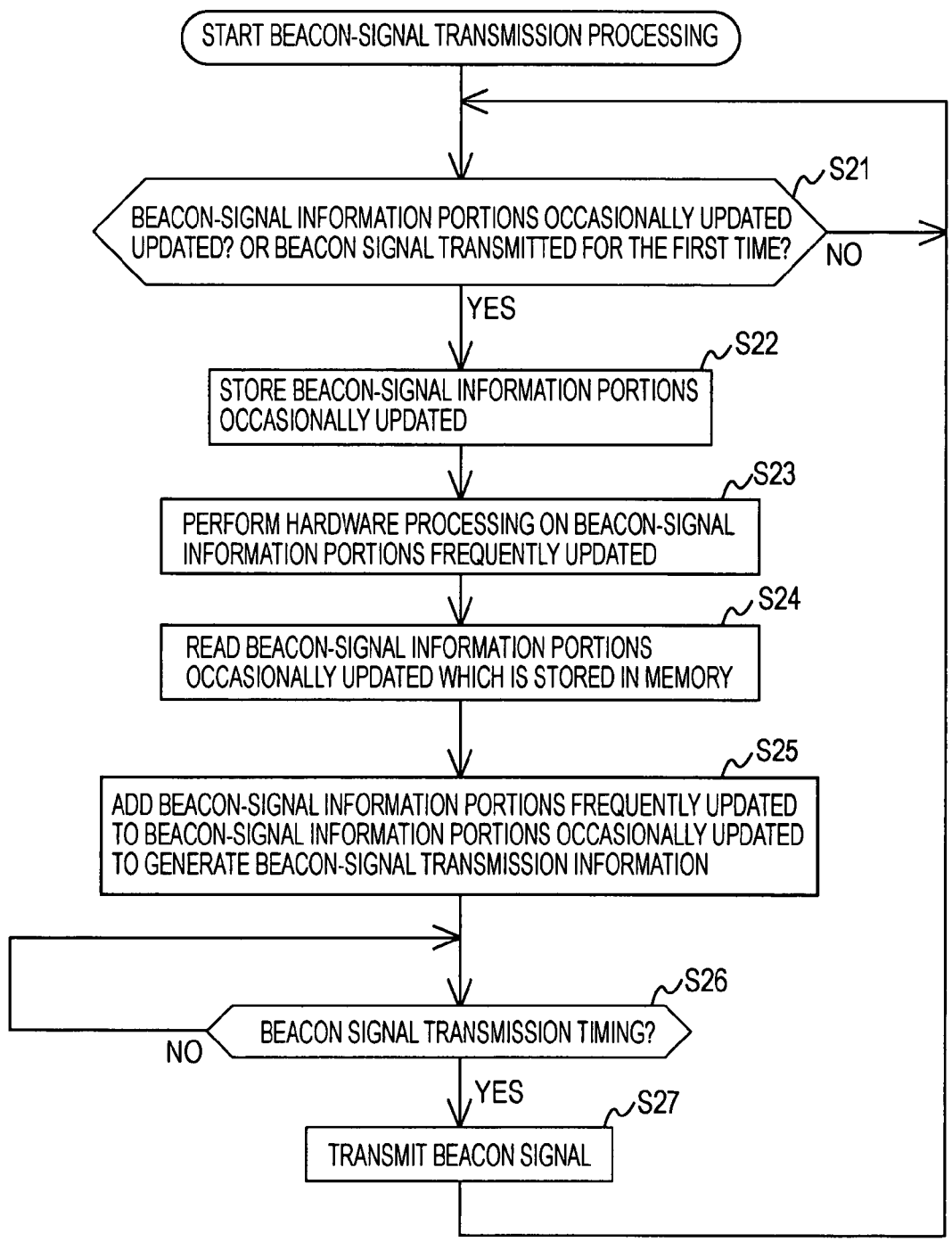
FIG. 8 is a flowchart illustrating beacons signal transmission processing performed by the transmitter.

According to still another embodiment of the present invention, there is provided a transmission method including the steps of performing, if a first information portion which is to be included in a beacon signal to be transmitted and which is not necessarily updated in every predetermined period of time has been updated, software processing on the updated first information portion, performing hardware processing on a second information portion which is to be included in the beacon signal to be transmitted and which is updated at least once in every predetermined period of time (for example, step S23 performed in FIG. 8), generating the beacon signal to be transmitted by adding the second information portion subjected to the hardware processing to the first information portion subjected to the software processing (for example, step S25 performed in FIG. 8), and transmitting the generated beacon signal (for example, step S27 performed in FIG. 8).

According to a further embodiment of the present invention, there is provided a reception device (for example, a receiver 11 shown in FIG. 5) including receiving means (for example, the reception unit 22 shown in FIG. 5) for receiving a beacon signal, separating means (for example, the information separation unit 23 shown in FIG. 5) for separating a first information portion which is included in the beacon signal received using the receiving means and which is not necessarily updated in every predetermined period of time from a second information portion which is included in the beacon signal received using the receiving means and which is updated at least once in every predetermined period of time, hardware processing means (for example, the hardware processor 24 shown in FIG. 5) for performing hardware processing on the second information portion separated using the separating means, determining means (for example, the comparator 27 shown in FIG. 5) for determining whether the first information portion separated using the separating means has been updated, and software processing means (for example, the CPU 28 shown in FIG. 5) for performing, if the determining means determines that the first information portion has been updated, software processing on the updated first information portion.

The reception device may further include compressing means (for example, a compressor 25 shown in FIG. 5) for compressing the first information portion, if the determining means determines that the first information portion has been updated, and storing means (for example, a previous value storage unit shown in FIG. 5) for storing the first information portion compressed using the compressing means.

The reception device may further include detecting means (for example, a detector 41.shown in FIG. 9) for detecting an operation status of the software processing means. When the detecting means detects an operation status indicating that the software processing means has been used more times than a predetermined threshold number of times, the separating means may separate an information portion of interest as a second information portion which is updated at least once in every predetermined period of time.

Figure 7:
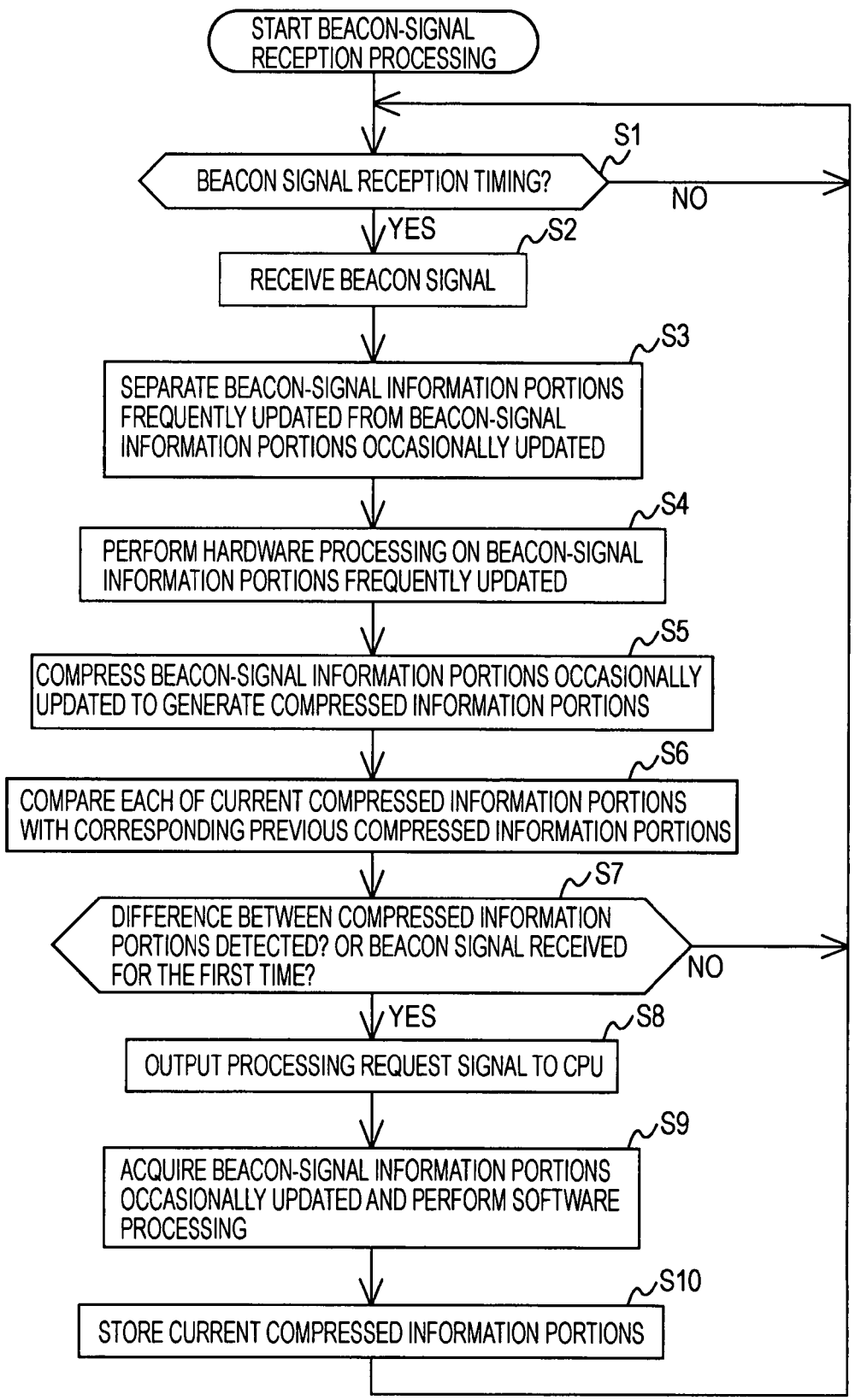
FIG. 7 is a flowchart illustrating beacon signal reception processing performed by the receiver.

According to a still further embodiment of the present invention, there is provided a reception method including the steps of receiving a beacon signal (for example, step S2 performed in FIG. 7), separating a first information portion which is included in the received beacon signal and which is not necessarily updated in every predetermined period of time from a second information portion which is included in the received beacon signal and which is updated at least once in every predetermined period of time (for example, step S3 performed in FIG. 7), performing hardware processing on the second information portion (for example, step S4 performed in FIG. 7), determining whether the first information portion separated using the separating means has been updated (for example, step S6 performed in FIG. 7), and performing, if it is determined that the first information portion has been updated, software processing on the updated first information portion (for example, step S9 performed in FIG. 7).

An embodiment of the present invention will be described hereinafter with reference to the accompanying drawings.

Figure 2:
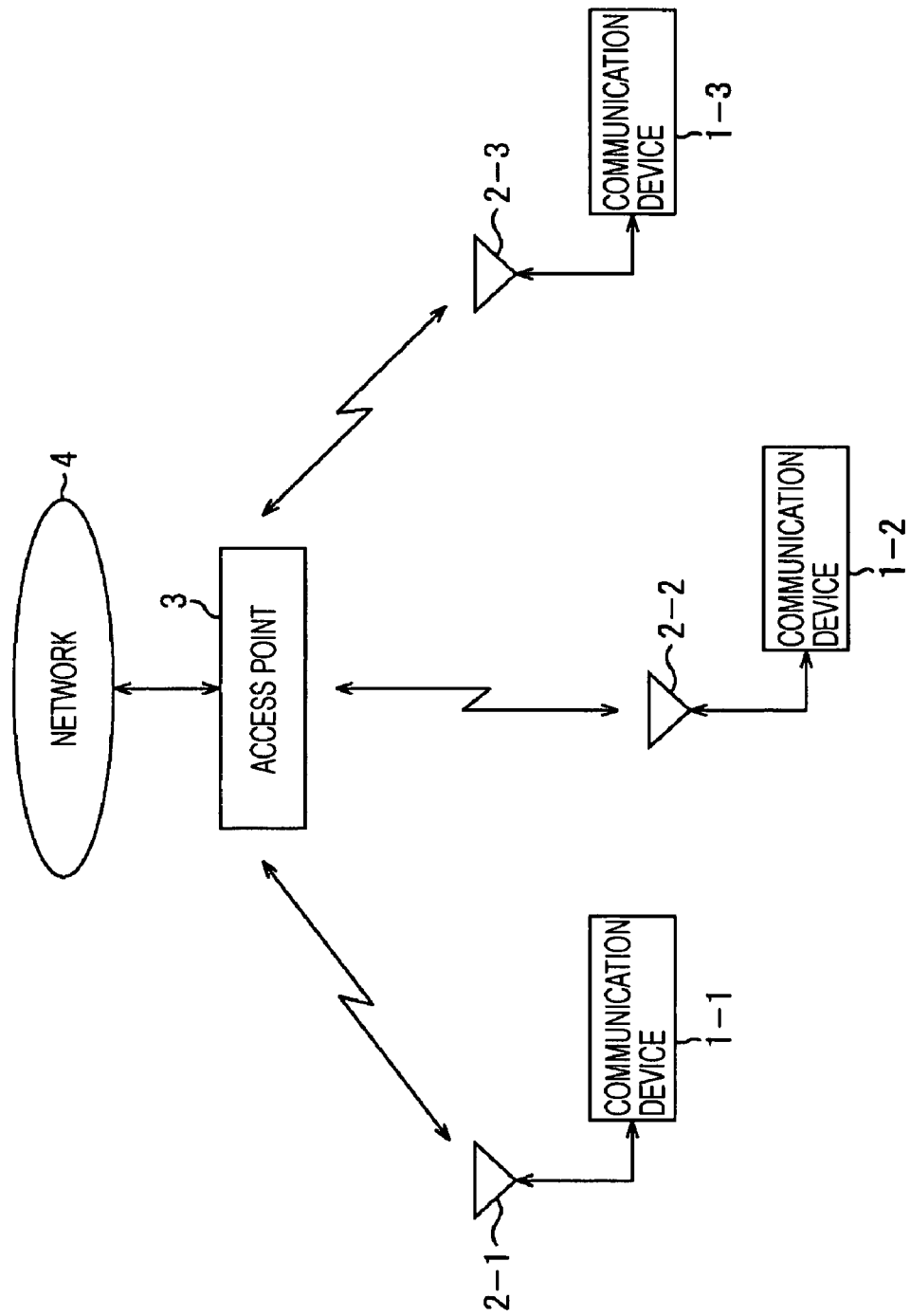
FIG. 2 is a diagram illustrating a communication system according to an embodiment of the present invention.

FIG. 2 is a diagram illustrating a communication system including communication devices 1-1 to 1-3 according to an embodiment of the present invention. The communication devices 1-1 to 1-3 in FIG. 2 have the same functions.

The communication devices 1-1 to 1-3 perform the following functions, for example, by executing various programs: a wireless information communication function; a function of recording a variety of information; a function of reproducing audio and video; a function of displaying the variety of recorded information, the reproduced video, and so-called GUIs (Graphic User Interface) which support operation inputs supplied by a user; a function receiving the operation inputs supplied by the user through various input devices provided therein. The communication devices 1-1 to 1-3 are simply referred to as a communication device 1 hereinafter unless otherwise distinguished from one another.

The communication device 1 is connected to other devices by means of a WLAN (Wireless Local Area Network; wireless LAN) complying with the 802.11 standard, for example, to transmit and receive information. The communication device 1, in the WLAN, selectively uses an infrastructure mode in which the communication device 1 communicates with the other devices through an access point 3 and an ad-hoc mode in which the communication device 1 directly communicates with the other devices without using the access point 3.

The communication device 1 is connected to a network 4, such as the Internet, by means of wireless communication through the access point 3 and transmits/receives information to/from various servers or other devices through the network 4.

The access point 3 is connected to the network 4 to thereby receive an externally transmitted packet addressed to a terminal and transmits the packet to the corresponding one of the communication devices 1-1 to 1-3. Furthermore, the access point 3 receives a packet to be transmitted to the outside from one of the communication devices 1-1 to 1-3 to thereby transmit the packet to the outside through the network 4.

Figure 3:
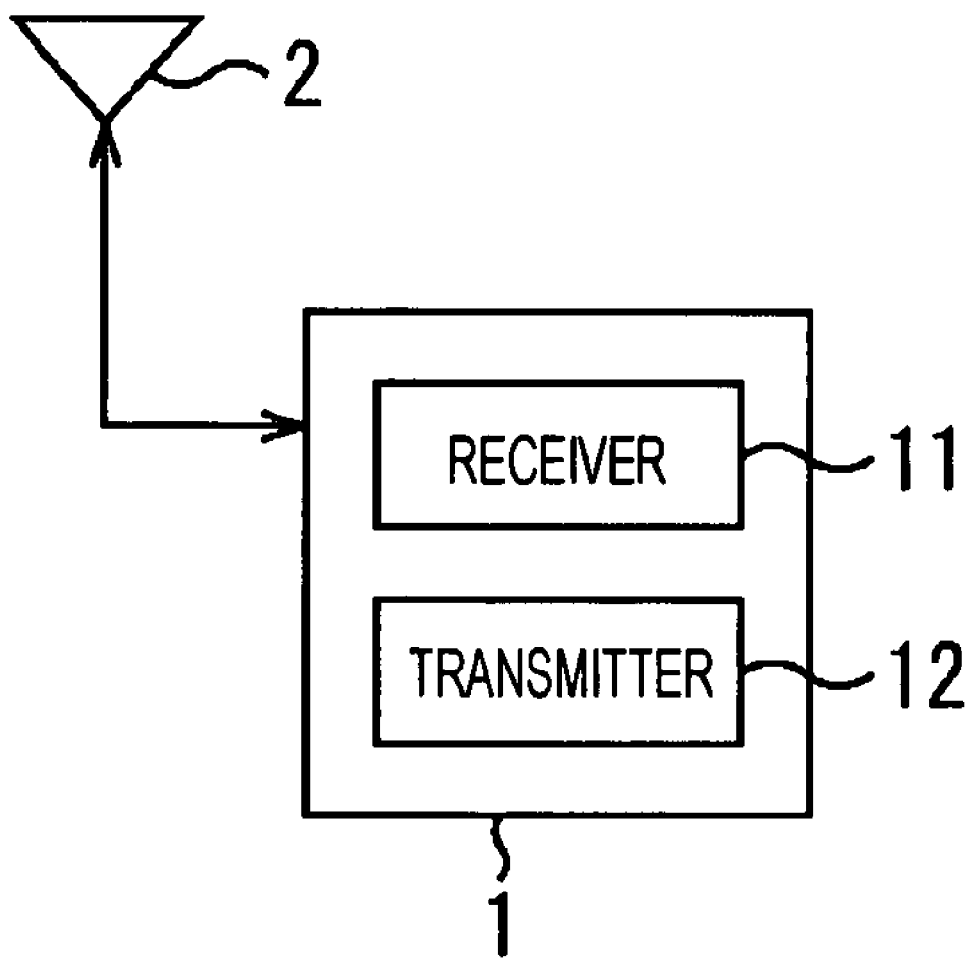
FIG. 3 is a diagram illustrating a configuration of a communication device shown in FIG. 2.

FIG. 3 illustrates a configuration of the communication device 1 shown in FIG. 2.

As shown in FIG. 3, the communication device 1 includes a receiver 11 and a transmitter 12. The receiver 11 receives signals of a variety of information transmitted from other communication devices through an antenna 2. The receiver 11 enters a hibernation mode at a specific timing to suppress the power consumption and is activated when receiving a beacon signal transmitted in a substantially constant cycle. The beacon signal includes a plurality of beacon-signal information portions. In these beacon-signal information portions, beacon-signal information portions which are frequently updated are subjected to hardware processing and beacon-signal information portions which are occasionally updated are subjected to software processing.

Each of the beacon-signal information portions which are frequently updated is a beacon-signal information portion which is updated at least once every 0.5 seconds to one second, whereas each of the beacon-signal information portions which are occasionally updated is included in beacon-signal information portions other than the beacon-signal information portions which are frequently updated.

The transmitter 12 transmits the signals of the variety of information through the antenna 2 to the other communication devices. The transmitter 12 transmits a beacon signal including information regarding the communication device 1 including the transmitter 12 at a specific timing. The beacon signal includes a plurality of beacon-signal information portions. In these beacon-signal information portions to be transmitted, beacon-signal information portions which are frequently updated are subjected to hardware processing and beacon-signal information portions which are occasionally updated are subjected to software processing.

FIG. 4 shows an example of transmitted beacon-signal information portions included in a beacon signal.

The beacon-signal information portions are controlled using element IDs and transmitted in a description format called information element (IE).

In the beacon-signal information portions shown in FIG. 4, a beacon-signal information portion having an element ID "0" and having an information element of "Traffic Indication Map IE (TIMIE)" and a beacon-signal information portion having an element ID "2" and having an information element of "PCA Availability IE" correspond to the beacon-signal information portions which are frequently updated. A beacon-signal information portion having an element ID "1" and having an information element of "Beacon Period Occupancy IE (BPOIE)", a beacon-signal information portion having an element ID "8" and having an information element of "DRP Availability IE", a beacon-signal information portion having an element ID "9" and having an information element of "Distributed Reservation Protocol IE (DRP IE)", a beacon-signal information portion having an element ID "10" and having an information element of "Hibernation Mode IE", a beacon-signal information portion having an element ID "11" and having an information element of "BP Switch IE", a beacon-signal information portion having an element ID "14" and having an information element of "Probe IE", a beacon-signal information portion having an element ID "15" and having an information element of "Application-specific Probe IE", a beacon-signal information portion having an element ID "16" and having an information element of "Link Feedback IE", a beacon-signal information portion having an element ID "17" and having an information element of "Hibernation Anchor IE", a beacon-signal information portion having an element ID "18" and having an information element of "Channel Change IE", and a beacon-signal information portion having an element ID "20" and having an information element of "Master Key Identifier (MKID) IE" correspond to the beacon-signal information portions which are occasionally updated. A beacon-signal information portion having an element ID "12" and having an information element of "Capabilities IE", a beacon-signal information portion having an element ID "13" and having an information element of "PHY Capabilities IE", and a beacon-signal information portion having an element ID "19" and having an information element of "Identification IE" correspond to beacon-signal information portions which are not updated.

Figure 5:
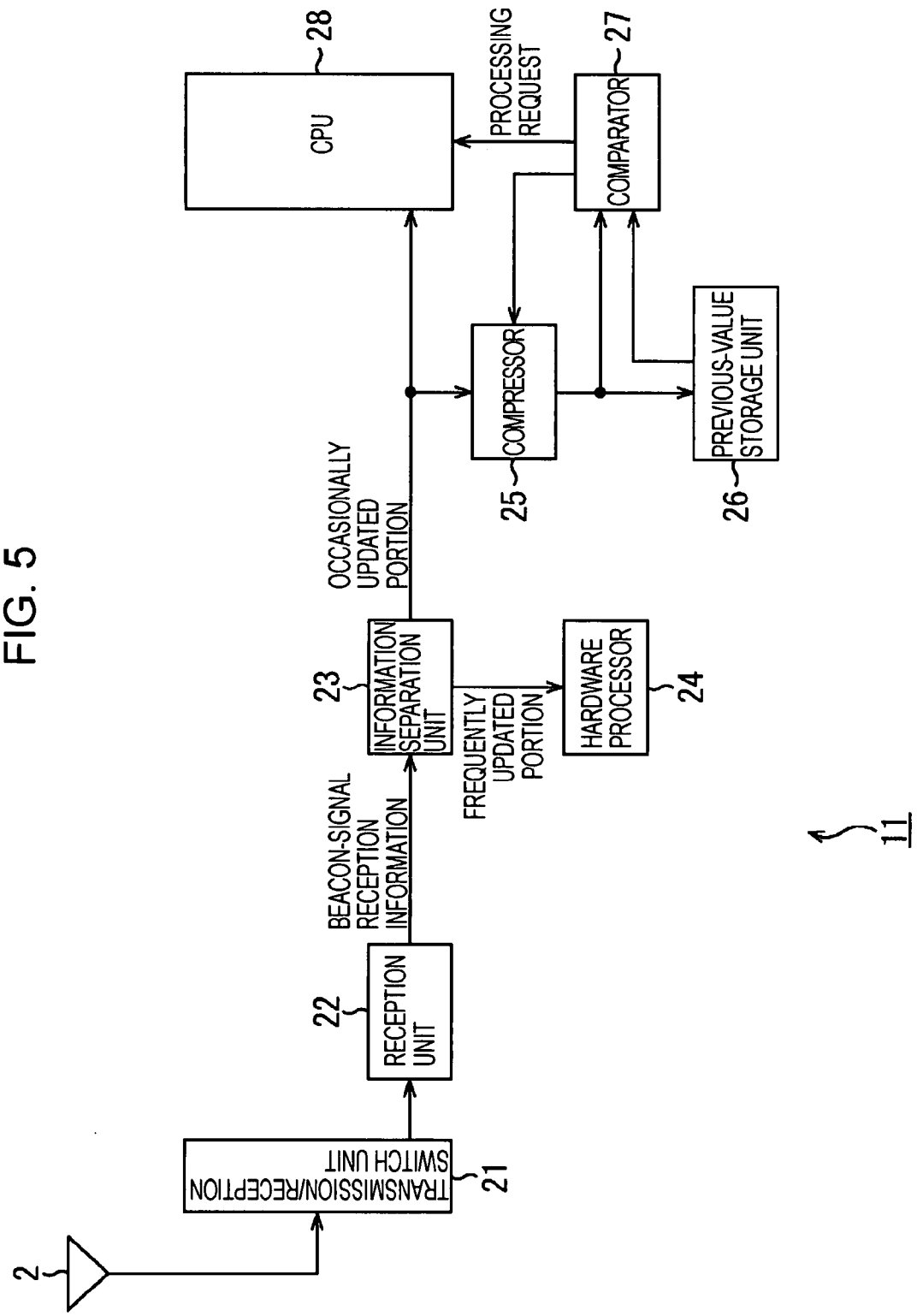
FIG. 5 is a block diagram illustrating a configuration of a receiver shown in FIG. 3.

FIG. 5 is a block diagram illustrating a configuration of the receiver 11 shown in FIG. 3.

As shown in FIG. 5, the receiver 11 includes a transmission/reception switch unit 21, a reception unit 22, an information separation unit 23, a hardware processor 24, a compressor 25, a previous-value storage unit 26, a comparator 27, and a CPU 28. In this configuration, the hardware processor 24 is implemented by hardware and the other units are implemented by software.

When receiving a beacon signal through the antenna 2, the transmission/reception switch unit 21 transmits the beacon signal to the reception unit 22. Note that when transmitting a beacon signal generated in the communication device 1, the transmission/reception switch unit 21 transmits the beacon signal through the antenna 2, as will be described later with reference to FIG. 6.

When the beacon signal is received, the reception unit 22 starts operation. The reception unit 22 performs demodulation processing on the beacon signal supplied from the transmission/reception switch unit 21 to obtain beacon-signal reception information and supplies the beacon-signal reception information to the information separation unit 23. The information separation unit 23 separates beacon-signal information portions which are frequently updated from beacon-signal information portions which are occasionally updated which are included in beacon-signal reception information. The information separation unit 23 supplies the beacon-signal information portions which are frequently updated to the hardware processor 24 and supplies the beacon-signal information portions which are occasionally updated to the compressor 25 and the CPU 28.

Specifically, among the beacon-signal information portions shown in FIG. 4, the beacon-signal information portion having the element ID "0" and having the information element "Traffic Indication Map IE (TIMIE)" and the beacon-signal information portion having the element ID "2" and having the information element "PCA Availability IE" as beacon-signal information portions which are frequently updated are transmitted to the hardware processor 24. The other beacon-signal information portions are transmitted to the compressor 25 and the CPU 28.

The hardware processor 24 performs specific hardware processing on the beacon-signal information portions which are frequently updated supplied from the information separation unit 23. The compressor 25 performs processing to considerably reduce the number of information bits by means of a hash function on the beacon-signal information portions which are occasionally updated to generate compressed information portions and supplies the compressed information portions to the comparator 27. The compressor. 25 controls the previous-value storage unit 26 to store the generated compressed information portions in accordance with an instruction issued by the comparator 27.

The comparator 27 reads each of the compressed information portions obtained from the most recently received beacon signal and supplied from the compressor 25 (hereinafter referred to as "current compressed information portions") and each of the compressed information portions which were stored in the previous-value storage unit 26 when a beacon signal immediately prior to the most recently received beacon signal was received (hereinafter referred to as "previous compressed information portions"), and compares each of the current compressed information portions with corresponding one of the previous compressed information portions. When detecting a difference between the current compressed information portions and the previous compressed information portions, the comparator 27 outputs a processing request signal to the CPU 28. Furthermore, the comparator 27 instructs the compressor 25 to control the previous-value storage unit 26 to store the current compressed information portion. Note that when a beacon signal is received for the first time, the previous-value storage unit 26 is not storing anything. In this case also, the comparator 27 outputs the processing request signal to the CPU 28 and instructs the compressor 25 to control the previous-value storage unit 26 to store the compressed information portion obtained when a beacon signal is received for the first time.

The CPU 28 performs specific software processing, in accordance with the processing request signal supplied from the comparator 27, on the beacon-signal information portions which are occasionally updated and which are supplied from the information separation unit 23. If the comparator 27 transmits no processing request signals, the CPU 28 does not perform any processing.

Figure 6:
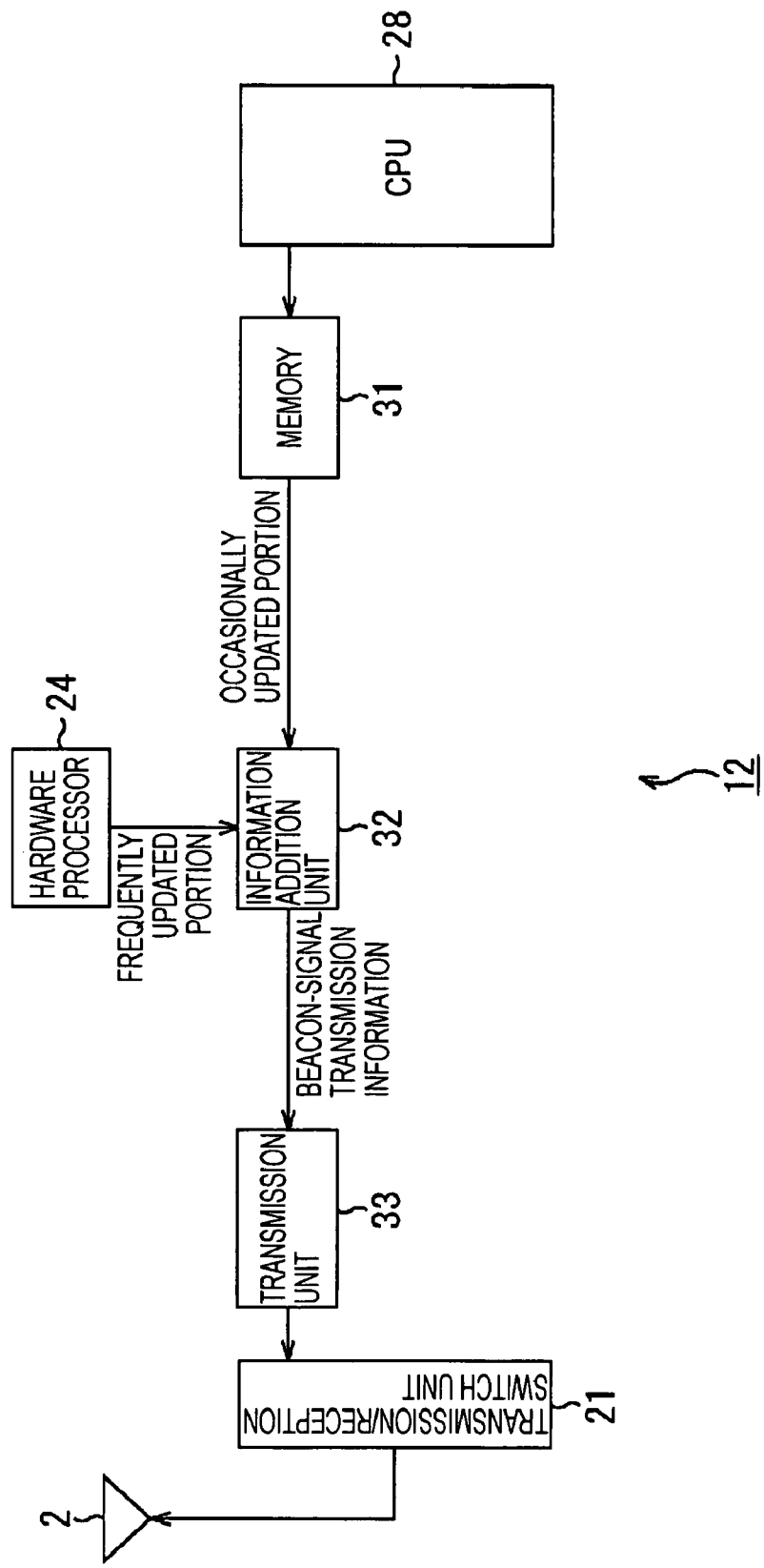
FIG. 6 is a block diagram illustrating a configuration of a transmitter shown in FIG. 3.

FIG. 6 is a block diagram illustrating a configuration of the transmitter 12 shown in FIG. 3.

As shown in FIG. 6, the transmitter 12 includes the transmission/reception switch unit 21, the hardware processor 24, the CPU 28, a memory 31, an information addition unit 32, and a transmission unit 33. In this configuration, the hardware processor 24 is implemented by hardware and the other units are implemented by software. The hardware processor 24 and the CPU 28 in the transmitter 12, which have the same reference numerals as those in the receiver 11 shown in FIG. 5, are designed to be shared with the receiver 11 shown in FIG. 5. However, each of the receiver 11 and the transmitter 12 may have its own hardware processor 2,4 and own CPU 28.

The transmission/reception switch unit 21 transmits the beacon signal supplied from the transmission unit 33 through the antenna 2.

Among beacon-signal information portions to be transmitted, when at least one of beacon-signal information portions which are occasionally updated has been updated, the CPU 28 performs specific software processing as needed on the beacon-signal information portions and controls the memory 31 to store the beacon-signal information portions which are occasionally updated. Note that the memory 31 does not store anything when a beacon signal is to be transmitted for the first time. In this case, the CPU 28 controls the memory 31 to store the beacon-signal information portions which are occasionally updated. From transmission processing of the second beacon signal onward, when it is determined that any beacon-signal information portions which are occasionally updated have not been updated, the CPU 28 does not perform any processing.

The hardware processor 24 generates, by means of hardware processing, beacon-signal information portions which are frequently updated and supplies the beacon-signal information portions which are frequently updated to the information addition unit 32.

The information addition unit 32 reads the beacon-signal information portions which are occasionally updated from the memory 31 and adds the beacon-signal information portions which are frequently updated and which are supplied from the hardware processor 24 to the beacon-signal information portions which are occasionally updated to thereby generate beacon-signal transmission information. The generated beacon-signal transmission information is supplied to the transmission unit 33.

The transmission unit 33 is activated when the beacon signal is to be transmitted. The transmission unit 33 performs specific modulation processing on the beacon-signal transmission information supplied from the information addition unit 32 to obtain a beacon signal and outputs the obtained beacon signal through the transmission/reception switch unit 21 and the antenna 2.

Referring now to a flowchart shown in FIG. 7, beacon-signal reception processing performed by the receiver 11 is described. The processing shown in FIG. 7 is started while the receiver 11 is in a hibernation mode. That is, the receiver 11 waits until beacon signal reception timing is reached.

In step S1, the reception unit 22 determines whether the beacon signal reception timing has been reached, and waits until the determination is affirmative. That is, the reception unit 22 remains in the hibernation mode until the determination is affirmative.

When the determination is affirmative in step S1, the flow proceeds to step S2 where the reception unit 22 receives the beacon signal through the antenna 2 and the transmission/reception switch unit 21. Then, the reception unit 22 performs specific demodulation processing on the beacon signal to obtain beacon-signal reception information.

The beacon-signal reception information obtained in step S2 includes beacon information portions which are frequently updated and beacon signal information portions which are occasionally updated. In step S3, the information separation unit 23 separates the beacon-signal information portions which are frequently updated from the beacon-signal information portions which are occasionally updated. In step S4, the hardware processor 24 performs specific hardware processing on the beacon-signal information portions which are frequently updated and which were separated in step S3.

In step S5, the compressor 25 performs processing to considerably reduce the number of information bits by means of a hash function on the beacon-signal information portions which are occasionally updated and which were obtained in step S3 to generate compressed information portions.

In step S6, the comparator 27 reads, from the previous-value storage unit 26, each of the compressed information portions which were obtained from the most recently received beacon signal and which were generated in step S5 (hereinafter, "current compressed information portions") and each of the compressed information portions which were obtained from the beacon signal received immediately prior to the most recently received beacon signal and were stored in the previous-value storage unit 26 (hereinafter, "previous compressed information portions"), and compares each of the current compressed information portions with the corresponding one of the previous compressed information portions.

In step S7, in accordance with a comparison result obtained in step S6, the comparator 27 determines whether a difference between the current compressed information portions and the previous compressed information portions is detected, or the comparator 27 determines whether the received beacon signal is a beacon signal received for the first time.

When the comparator 27 determines that the difference between the current compressed information portions and the previous compressed information portions is detected, or that the received beacon signal is a beacon signal received for the first time, the flow proceeds to step S8. Accordingly, since it is determined that the beacon-signal information portions have been updated, the comparator 27 outputs a processing request signal to the CPU 28. Furthermore, the comparator 27 instructs the compressor 25 to control the previous-value storage unit 26 to store the current compressed information portions.

In step S9, in accordance with the processing request signal supplied from the comparator 27, the CPU 28 performs specific software processing on the beacon-signal information portions which are occasionally updated and which were supplied from the information separation unit 23.

In step S10, in accordance with an instruction issued from the comparator 27, the compressor 25 controls the previous-value storage unit 26 to store the current compressed information portions which were generated in the processing in step S5.

After the processing in step S10 is performed or after it is determined that the difference between the current compressed information portions and the previous compressed information portions is not detected in step S7, the flow returns to step S1 and the flow from step 1 onward is repeated.

As described above, the receiver 11 is designed before being shipped as a product such that the beacon-signal information portions which are frequently updated are subjected to hardware processing, whereas the beacon-signal information portions which are occasionally updated are subjected to software processing by the CPU 28 only when they have been updated. Accordingly, the receiver 11 receives a beacon signal while the power consumption is suppressed.

Furthermore, since the beacon-signal information portions which are occasionally updated are compressed by the compressor 25 before being stored in the previous-value storage unit 26, a memory area may be reduced.

Referring next to a flowchart shown in FIG. 8, beacon-signal transmission processing performed by the transmitter 12 will be described. The processing performed in FIG. 8 is started while the transmitter 12 is in a hibernation mode. The transmitter 12 waits until the beacon-signal information portions which are occasionally updated are updated.

In step S21, the CPU 28 determines whether at least one of the beacon-signal information portions which are occasionally updated has been updated or a beacon signal is to be transmitted for the first time. The CPU 28 waits until the determination is affirmative. That is, the CPU 28 remains in a hibernation mode until the determination is affirmative.

When the determination is affirmative in step S21, the flow proceeds to step S22. In step S22, the CPU 28 performs specific software processing as needed on the beacon-signal information portions which are occasionally updated and controls the memory 31 to store the beacon-signal information portions which are occasionally updated. In step S23, the hardware processor 24 performs specific hardware processing on the beacon-signal information portions which are frequently updated.

In step S24, the information addition unit 32 reads the beacon-signal information portions which are occasionally updated and which are stored in the memory 31. In step S25, the information addition unit 32 adds the beacon-signal information portions which are frequently updated to the beacon-signal information portions which are occasionally updated to thereby generate beacon-signal transmission information.

In step S26, the transmission unit 33 determines whether beacon-signal transmission timing has been reached and waits until the determination is affirmative. In step S26, when the determination is affirmative, the flow proceeds to step S27 where the transmission unit 33 performs specific modulation processing on the beacon-signal transmission information to obtain a beacon signal. Then the transmission unit 33 transmits the obtained beacon signal through the transmission/reception switch unit 21 and the antenna 2.

After the processing in step S27 is performed, the flow returns to step S21 and the flow from step 1 onward is repeated.

As described above, the transmitter 12 is designed before being shipped as a product such that the beacon-signal information portions which are frequently updated are subjected to hardware processing, whereas the beacon-signal information portions which are occasionally updated are subjected to software processing by the CPU 28 only when they have been updated. Accordingly, the transmitter 12 transmits a beacon signal while the power consumption is suppressed.

Furthermore, as described above, the receiver 11 and the transmitter 12 are designed before being shipped as products such that the beacon-signal information portions which are frequently updated are subjected to hardware processing. However, the beacon-signal information portions which are occasionally updated may be subjected to hardware processing instead of software processing in accordance with an operation status of the CPU 28.

Figure 9:
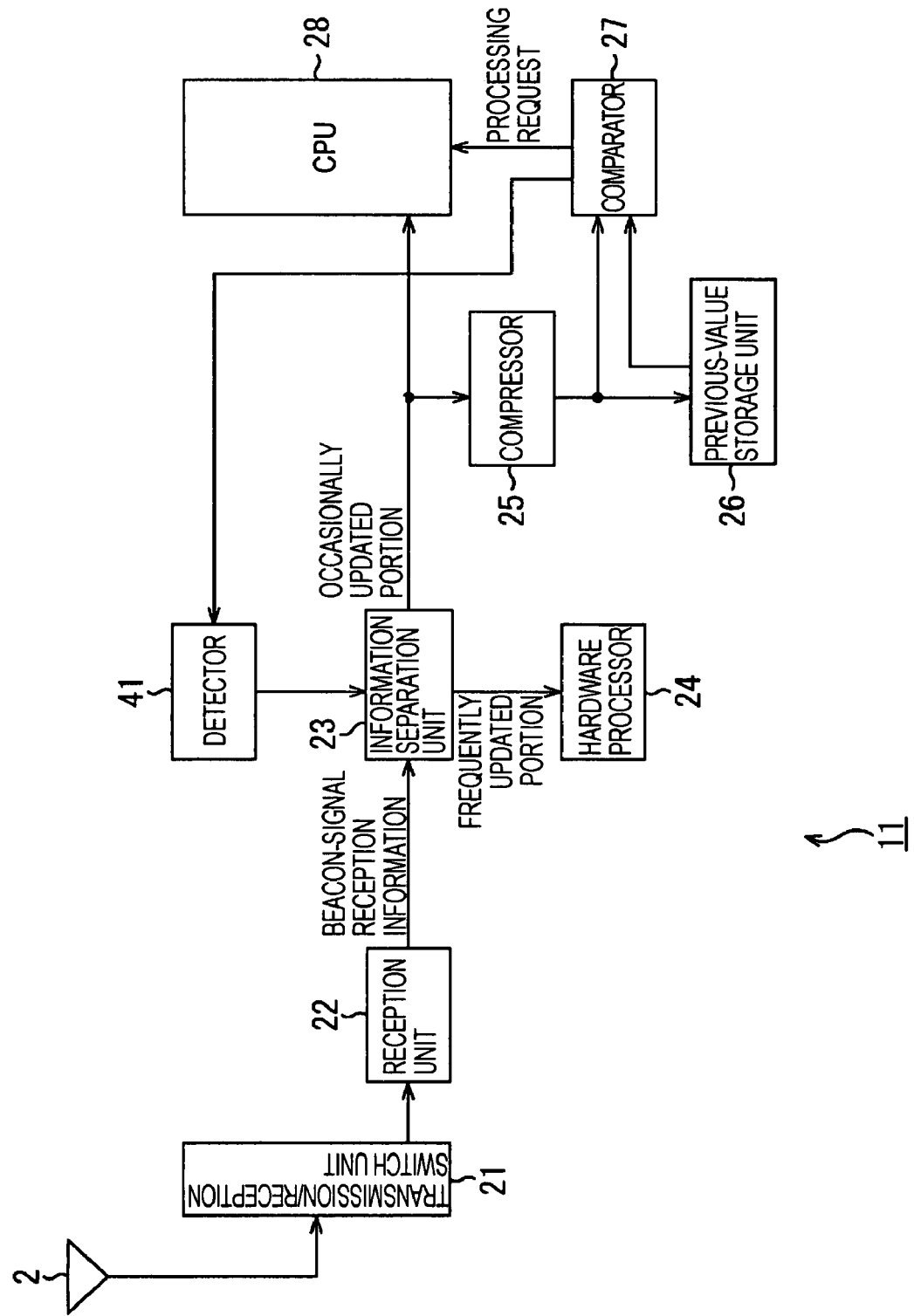
FIG. 9 is a block diagram illustrating another configuration of the receiver shown in FIG. 3.

FIG. 9 is a block diagram illustrating another configuration of the receiver 11 shown in FIG. 3. The configuration of the receiver 11 shown in FIG. 9 is different from that of the receiver 11 in FIG. 5 in that a detector 41 for detecting a signal supplied from the comparator 27 is included.

When it is determined that a difference is detected between the current compressed information portions and the previous compressed information portions, the comparator 27 outputs a processing request signal to the CPU 28. In addition, the comparator 27 instructs the compressor 25 to control the previous-value storage unit 26 to store the current compressed information portions. Furthermore, the comparator 27 outputs a signal indicating the difference between the current compressed information portions and the previous compressed information portions to the detector 41.

On the basis of the signal indicating the difference between the current compressed information portions and the previous compressed information portions, the detector 41 determines whether a utilization rate of the CPU 28 is not less than a predetermined threshold value. When it is determined that the utilization rate of the CPU 28 is not less than the predetermined threshold value, the detector 41 instructs the information separation unit 23 to determine that each of the beacon-signal information portions which is different from the corresponding previous compressed information portions and which uses the CPU 28 is a beacon-signal information portion which is frequently updated and to separate the beacon-signal information portion from the beacon-signal information portions which are occasionally updated.

Specifically, for example, when it is determined that the beacon-signal information portion having an element ID "1" and having an information element of "Beacon Period Occupancy" as a beacon-signal information portion which is occasionally updated and which was subjected to software processing by the CPU 28 has been updated while the utilization rate of the CPU 28 is not less than the predetermined threshold value, the detector 41 instructs the information separation unit 23 to determine that the beacon-signal information portion having the information element of "Beacon Period Occupancy" is a beacon-signal information portion which is frequently updated and to separate the beacon-signal information portion from the beacon-signal information portions which are occasionally updated. Accordingly, the information separation unit 23 determines that the beacon-signal information portion having an information element of "Beacon Period Occupancy" is a beacon-signal information portion which is frequently updated, separates the beacon-signal information portion from the beacon-signal information portions which are occasionally updated, and transmits the beacon-signal information portion to the hardware processor 24. The hardware processor 24 is configured by programmable hardware and performs specific hardware processing on the beacon-signal information portion having an information element of "Beacon Period Occupancy" supplied from the information separation unit 23.

Here, in a case where a beacon-signal information portion which is occasionally updated is updated once every 0.5 seconds to one second, the beacon-signal information portion is newly determined to be a beacon-signal information portion which is frequently updated. That is, when it is determined that the CPU 28 is used -once every 0.5 seconds to one second, the beacon-signal information portion which is occasionally updated and which uses the CPU 28 is newly determined to be a beacon-signal information portion which is frequently updated.

Figure 10:
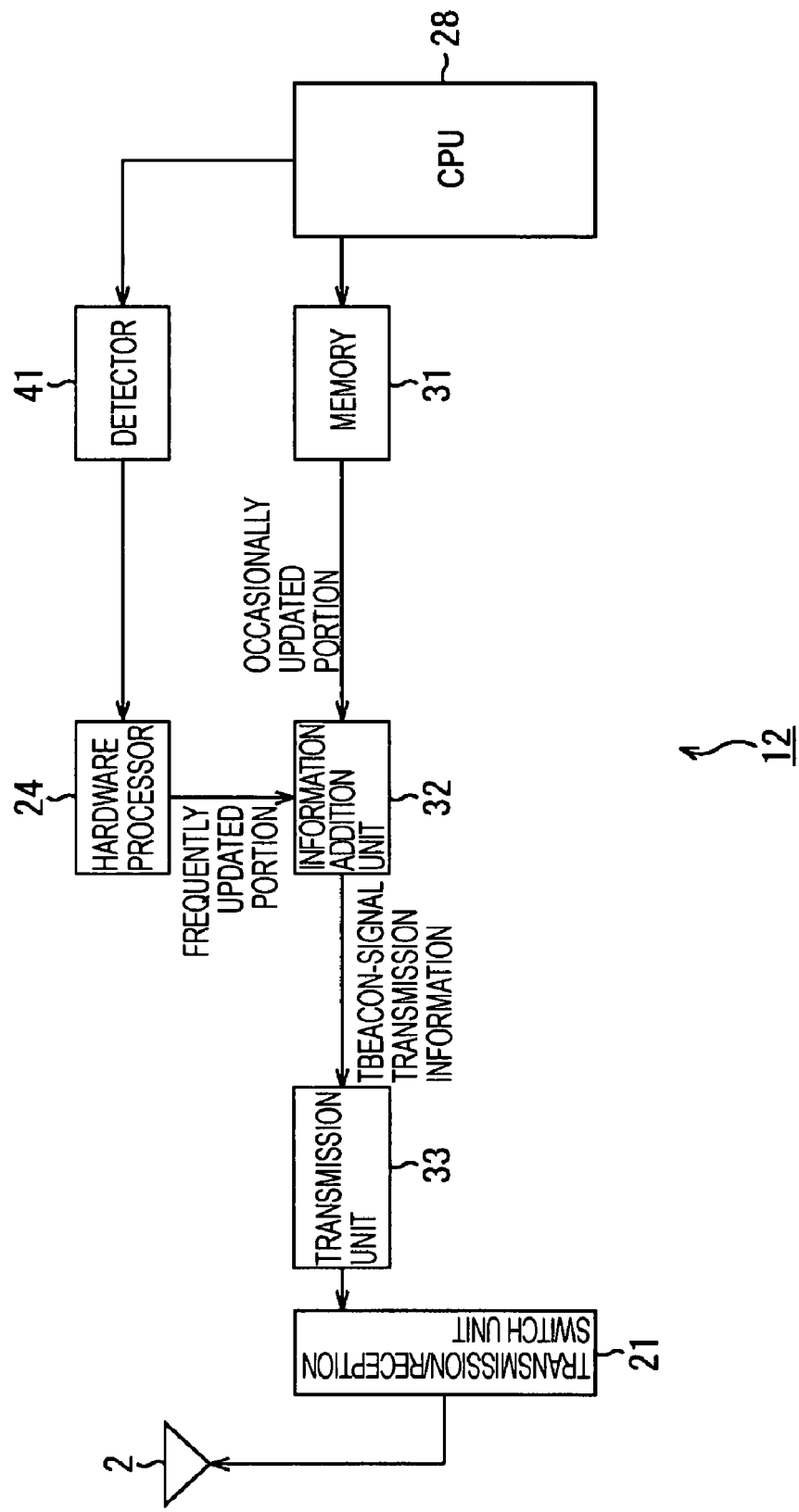
FIG. 10 is a block diagram illustrating another configuration of the transmitter shown in FIG. 3.

FIG. 10 is a block diagram illustrating another configuration of the transmitter 12 shown in FIG. 3. The configuration of the transmitter 12 shown in FIG. 10 is different from that of the transmitter 12 shown in FIG. 6 in that a detector 41 for detecting a signal supplied from the CPU 28 is included. The detector 41, which has the same reference numeral as that in the receiver 11 shown in FIG. 9, is designed to be shared with the receiver 11 shown in FIG. 9. However, each of the receiver 11 and the transmitter 12 may have its own detector 41.

Among the beacon-signal information portions to be transmitted, when it is determined that at least one of the beacon-signal information portions which are occasionally updated has been updated, the CPU 28 performs specific software processing as needed on the updated beacon-signal information portions which are occasionally updated and controls the memory 31 to store the beacon-signal information portions which are occasionally updated. Furthermore, the CPU 28 outputs a signal indicating that at least one of the beacon-signal information portions which are occasionally updated has been updated to the detector 41.

In response to the signal indicating that at least one of the beacon-signal information portions which are occasionally updated has been updated, the detector 41 determines whether the utilization rate of the CPU 28 is not less than a predetermined threshold value. When it is determined that the utilization rate of the CPU 28 is not less than the predetermined threshold value, the detector 41 instructs the hardware processor 24 to determine that each of the updated beacon-signal information portions is a beacon-signal information portion which is frequently updated and to perform hardware processing on each of the updated beacon-signal information portions.

Specifically, for example, when it is determined that the beacon-signal information portion having an element ID "8" and having an information element of "DRP Availability IE" as a beacon-signal information portion which is occasionally updated and which is subjected to software processing by the CPU 28 has been updated while the utilization rate of the CPU 28 is not less than the predetermined threshold value, the detector 41 instructs the hardware processor 24 to perform hardware processing on the beacon-signal information portion having the information element of "DRP Availability IE". The hardware processor 24 is configured by programmable hardware and performs specific hardware processing on the beacon-signal information portion having the information element of "DRP Availability IE" to generate a beacon-signal information portion which is frequently updated.

As described above, when a beacon-signal information portion which is occasionally updated is updated once every 0.5 seconds to one second, the beacon-signal information portion is newly determined to be a beacon-signal information portion which is frequently updated. That is, when it is determined that the CPU 28 is used once every 0.5 seconds to one second, the beacon-signal information portion which is occasionally updated and uses the CPU 28 is newly determined to be a beacon-signal information portion which is frequently updated.

As described above, since a beacon-signal information portion is subjected to hardware processing instead of software processing in accordance with an operation status of the CPU 28, a beacon signal is transmitted/received while the power consumption is suppressed.

Steps included in a program are obviously processed in an order of description in time-series herein. However, the order is not limited to this and the steps may be processed in parallel or individually.

Embodiments of the present invention are not limited to the embodiment described above and various modifications may be made without departing from the scope of the present invention.

What is claimed is:

1. A communication system comprising:
a transmission device that transmits a beacon signal; and
a reception device that receives the beacon signal,
wherein the transmission device includes
a first software processing unit configured to perform, when a first information portion to be included is updated, software processing on the updated first information portion,
a first hardware processing unit configured to perform hardware processing on a second information portion to be included in the beacon signal, the second information portion being updated at least once in every predetermined period of time, and
a transmitting unit configured to transmit the beacon signal, and
wherein the reception device includes
a second software processing unit,
a receiving unit configured to receive the beacon signal while the second software processing unit is in a state of hibernation,
a determining unit configured to determine whether the first information portion has been updated, wherein the second software processing unit is awakened from the state of hibernation to perform software processing on the first information portion when it is determined that the first information portion has been updated,
a separating unit configured to separate the first information portion from the second information portion included in the beacon signal received using the receiving unit, and
a second hardware processing unit configured to perform hardware processing on the second information portion separated using the separating unit;
wherein the software processing is performed by a central processing unit (CPU) and the hardware processing is performed by a programmable hardware.

2. A transmission device comprising:
a software processing unit configured to perform, when a first information portion to be included in a beacon signal has been updated, software processing on the updated first information portion;
a hardware processing unit configured to perform hardware processing on a second information portion to be included in the beacon signal, the second information portion being updated at least once in every predetermined period of time;
a generating unit configured to generate the beacon signal to be processed by the hardware processing unit of a recipient without awakening a software processing unit of the recipient when the first information portion is not updated; and
a transmitting unit configured to transmit the beacon signal;
wherein the software processing is performed by a central processing unit (CPU) and the hardware processing is performed by a programmable hardware.

3. The transmission device according to claim 2, further comprising:
a storage unit configured to store the first information portion subjected to the software processing using the software processing unit.

4. The transmission device according to claim 3,
wherein the storage unit stores the first information portion, irrespective of whether the first information portion has been updated, when a beacon signal is to be transmitted for the first time.

5. The transmission device according to claim 3, further comprising:
a detecting unit configured to detect an operation status of the software processing unit,
wherein, when the detecting unit detects an operation status indicating that the software processing unit has been used more times than a predetermined threshold number of times, the hardware processing unit performs hardware processing on an information portion of interest as a second information portion which is updated at least once in every predetermined period of time.

6. A transmission method comprising:
performing, by a software processing unit and when a first information portion which is to be included in a beacon signal is updated, software processing on the updated first information portion;
performing, by a hardware processing unit, hardware processing on a second information portion which is to be included in the beacon signal and which is updated at least once in every predetermined period of time;
generating, by a generating unit, the beacon signal to be processed by the hardware processing unit of a recipient without awakening the software processing unit of the recipient when the first information portion is not updated; and
transmitting, by a transmission unit, the generated beacon signal;
wherein the software processing is performed by a central processing unit (CPU) and the hardware processing is performed by a programmable hardware.

7. A reception device comprising:
a receiving unit configured to receive a beacon signal while a software processing unit is in a state of hibernation;
a separating unit configured to separate a first information portion which is included in the beacon signal received using the receiving unit and which is not necessarily updated in every predetermined period of time from a second information portion which is included in the beacon signal received using the receiving unit and which is updated at least once in every predetermined period of time;

a hardware processing unit configured to performing hardware processing on the second information portion separated using the separating unit; and a determining unit configured to determine whether the first information portion separated using the separating unit has been updated, wherein the software processing unit is awakened from the state of hibernation to perform software processing on the first information portion when it is determined that the first information portion has been updated; wherein the software processing unit performs, when the determining unit determines that the first information portion has been updated, software processing on the updated first information portion; and the software processing is performed by a central processing unit (CPU) and the hardware processing is performed by a programmable hardware.

8. The reception device according to claim 7, further comprising:

a compressing unit configured to compress the first information portion, if the determining unit determines that the first information portion has been updated; and a storage unit configured to store the first information portion compressed using the compressing unit.

9. The reception device according to claim 8, wherein the storage unit stores the first information portion, irrespective of whether the first information portion has been updated, when a beacon signal is received for the first time.

10. The reception device according to claim 8, wherein the determining unit compares the first information portion included in a beacon signal which was most recently received and which has been stored in the storage unit with a first information portion included in a beacon signal which was received immediately prior to the most recently received signal and determines whether the first information portion has been updated.

11. The reception device according to claim 8, further comprising:

a detecting unit configured to determine an operation status of the software processing unit, wherein, when the detecting unit detects an operation status indicating that the software processing unit has been used more times than a predetermined threshold number of times, the separating unit separates an information portion of interest as a second information portion which is updated at least once in every predetermined period of time.

12. A reception method comprising:

receiving a beacon signal;

separating a first information portion which is included in the received beacon signal and which is not necessarily updated in every predetermined period of time from a second information portion which is included in the received beacon signal and which is updated at least once in every predetermined period of time;

performing hardware processing on the second information portion;

determining whether the first information portion has been updated, wherein a software processing unit is awakened from a state of hibernation when it is determined that the first information portion has been updated; and performing, when it is determined that the first information portion has been updated, software processing on the updated first information portion;

wherein the software processing is performed by a central processing unit (CPU) and the hardware processing is performed by a programmable hardware.

13. A communication system comprising:

a transmission device that transmits a beacon signal; and a reception device that receives the beacon signal, wherein the transmission device includes a first software processor configured to perform, when a first information portion to be included is updated, software processing on the updated first information portion, a first hardware processor configured to perform hardware processing on a second information portion to be included in the beacon signal, the second information portion being updated at least once in every predetermined period of time, and a transmitter configured to transmit the beacon signal, and wherein the reception device includes a second software processing unit;

a reception unit configured to receive the beacon signal while the second software processing unit is in a state of hibernation, a separator configured to separate the first information portion from the second information portion included in the beacon signal received using the reception unit, a second hardware processor configured to perform hardware processing on the second information portion separated using the separator, and a determination unit configured to determine whether the first information portion separated using the separator has been updated, wherein the second software processing unit is awakened from the state of hibernation to perform software processing on the first information portion when it is determined that the first information portion has been updated, wherein the software processing is performed by a central processing unit (CPU) and the hardware processing is performed by a programmable hardware.

14. A transmission device comprising:

a software processor configured to perform, when a first information portion to be included in a beacon signal has been updated, software processing on the updated first information portion;

a hardware processor configured to perform hardware processing on a second information portion to be included in the beacon signal, the second information portion being updated at least once in every predetermined period of time;

a generation unit configured to generate the beacon signal to be processed by a hardware processor of a recipient without awakening a software processor of the recipient when the first information portion is not updated; and a transmission unit configured to transmit the beacon signal;

wherein the software processing is performed by a central processing unit (CPU) and the hardware processing is performed by a programmable hardware.

15. A reception device comprising:

a reception unit configured to receive a beacon signal;

a determining unit configured to determine whether a first information portion has been updated;

a separator configured to separate the first information portion which is included in the beacon signal received using the reception unit and which is not necessarily updated in every predetermined period of time from a second information portion which is included in the beacon signal received using the reception unit and which is updated at least once in every predetermined period of time;

a hardware processor configured to perform hardware processing on the second information portion separated using the separator;

a determination unit configured to determine whether the first information portion separated using the separator has been updated; and a software processor configured to perform, when the determination unit determines that the first information portion has been updated, software processing on the updated first information portion, wherein the software processor is awakened from a state of hibernation to perform the software processing;

wherein the software processing is performed by a central processing unit (CPU) and the hardware processing is performed by a programmable hardware.

* * * * *